US006678606B2

United States Patent
Akins et al.

(10) Patent No.: US 6,678,606 B2
(45) Date of Patent: Jan. 13, 2004

(54) TAMPER DETECTION FOR VEHICLE CONTROLLER

(75) Inventors: Mark Akins, Columbus, IN (US); Scott Thompson, Columbus, IN (US); Dave O'dell, Columbus, IN (US); Gopal Chamarthi, Farmington Hills, MI (US); Shu Zhang, Columbus, IN (US)

(73) Assignee: Cummins Inc., Columbus, IN (US)

( * ) Notice: Subject to any disclaimer, the term of this patent is extended or adjusted under 35 U.S.C. 154(b) by 179 days.

(21) Appl. No.: 09/952,555

(22) Filed: Sep. 14, 2001

(65) Prior Publication Data

US 2003/0055552 A1 Mar. 20, 2003

(51) Int. Cl.$^7$ .............................. G06F 19/00; G06G 7/70
(52) U.S. Cl. ...................... 701/114; 701/115; 395/376; 395/395; 711/100; 711/170; 707/1; 707/6
(58) Field of Search ................................. 701/114, 115; 711/100, 170; 395/182.01, 376–395; 707/1

(56) References Cited

U.S. PATENT DOCUMENTS

| | | | | |
|---|---|---|---|---|
| 4,737,913 A | * | 4/1988 | Blee et al. ..................... 701/97 |
| 5,303,163 A | | 4/1994 | Ebaugh et al. ............... 364/550 |
| 5,365,436 A | | 11/1994 | Schaller et al. ........ 364/424.03 |
| 5,426,585 A | | 6/1995 | Stepper et al. ......... 364/424.03 |
| 5,586,130 A | | 12/1996 | Doyle ........................... 371/62 |
| 5,606,315 A | | 2/1997 | Gaskins ................. 340/825.34 |
| 5,706,199 A | | 1/1998 | Wilson et al. ......... 364/426.041 |
| 5,787,367 A | | 7/1998 | Berra ............................ 701/1 |
| 5,787,484 A | * | 7/1998 | Norman ....................... 711/159 |
| 5,815,071 A | | 9/1998 | Doyle ......................... 340/439 |
| 5,884,210 A | | 3/1999 | Rettig et al. ................ 701/115 |
| 5,896,083 A | | 4/1999 | Weisman, II et al. ....... 340/438 |
| 5,957,985 A | | 9/1999 | Wong et al. ................... 701/33 |
| 5,974,368 A | | 10/1999 | Schepps et al. ............. 702/188 |
| 5,991,673 A | | 11/1999 | Koopman, Jr. et al. ....... 701/32 |
| 6,076,026 A | | 6/2000 | Jambhekar et al. ........... 701/35 |
| 6,076,037 A | * | 6/2000 | Ono et al. .................. 701/115 |
| 6,343,249 B1 | * | 1/2002 | Sakai et al. ................... 701/48 |
| 6,502,019 B1 | * | 12/2002 | Zydek et al. ................. 701/29 |

* cited by examiner

*Primary Examiner*—Hieu T. Vo
*Assistant Examiner*—Johnny H. Hoang
(74) *Attorney, Agent, or Firm*—Woodard, Emhardt, Moriarty, McNett & Henry LLP

(57) ABSTRACT

A system and method are disclosed for detecting tampering with the software, software parameters, and calibration data used by a vehicle controller. During authorized installation of controller memory images, a hash function is applied to selected regions of controller memory to obtain stored hash values. Then, periodically during operation of the vehicle, the hash function is applied to the then-current contents of the controller memory to obtain calculated hash values. If the stored hash values stored do not match the calculated hash values, a fault is logged for future retrieval by service personnel.

21 Claims, 3 Drawing Sheets

½ …

TAMPER DETECTION FOR VEHICLE CONTROLLER

BACKGROUND

The present invention relates to the detection of tampering with controller data; more specifically, the detection of changes to software, control parameters, and calibration data (some or all of which is referred to as "control data" herein) in embedded control systems.

Many vehicle engines are controlled by engine control modules (ECMs). Individuals or companies sometimes modify fuel system software and calibration data to increase the power output of the engine. In some modifications, the control data are temporarily or permanently altered, resulting in operation outside the fuel system design limits, which damages vital components of the engine. This damage may result in additional warranty repair costs to the manufacturer, even though the damage was the result of tampering by another party.

Present tamper detection and tamper-proofing systems suffer from a lack of effectiveness, excessive cost, and/or excessive complexity. For example, U.S. Pat. No. 5,884,210 to Rettig et al. discloses a communications device connectable to an engine controller. In the communications device are a predetermined set of vehicle operating parameters that are expected to be used in the engine. When the communications device is connected to the engine, the parameters present in the engine controller are compared to values stored in the communications device. An exception is stored and reported for each parameter that does not match.

U.S. Pat. No. 5,787,367 to Berra discloses a system and method for providing secured programming and reprogramming for on-board vehicle computer systems. A pair of passwords is used to establish whether a user is authorized to reprogram the computer with new data, then to encrypt the data during transfer from a communications tool to the computer. Reprogramming of the computer's control software is allowed only when a certain encrypted data value matches the data value stored in the device.

U.S. Pat. No. 5,426,585 to Stepper et al. discloses a method and apparatus for generating calibration information in which subfiles are defined for different categories of engine data. Each subfile includes line checksums, a CRC, a date, a type identifier, and an authorization level. Data is verified using rules from a rules file, associated with the subfile type, that defines criteria for individual data items and relationships between them. The checksums, CRC values, and authorization levels are checked before a subfile is used by the engine (or by a communications tool used to reprogram such devices).

There is thus a need for further contributions and improvements to controller software and data tamper detection technology.

SUMMARY

It is an object of the present invention to provide an improved system and method for detecting tampering with controller software, parameters, and data.

These objects and others are achieved by various forms of the present invention. One form of the present invention is a system for detecting modification of control data in an electronically controlled engine. A memory contains the control data, and a data storage unit contains a stored hash value (corresponding to the result of applying a hash function to a first portion of the memory). A processor executes instructions from a computer-readable medium to apply the hash function to the portion of the memory to obtain a calculated hash value. If the calculated hash value is not equal to the stored hash value, the processor generates an error signal in an error log.

In one variation of this embodiment, the data storage unit also contains a second stored value, which corresponds to the result of applying the first hash function to a second portion of the memory, and where the second portion is different from the first portion. In this variation, the programming instructions are also executable by the processor to apply the hash function to the second portion of the memory to obtain a second calculated hash value while the engine is operating; and to generate an error signal in the error log if the second calculated hash value and the second stored value are not equal.

In some such embodiments, the first portion of the memory is made up of two or more address ranges. Sometimes the memory is made up of a first memory device and a second memory device, and the two or more address ranges cover at least part of each device. In one case, one device is a flash memory device, while the other is an EEPROM.

In some embodiments of this form of the invention, the data storage is in the memory.

In other embodiments, the first portion of the memory is defined by one, two, or more address range data elements stored in the memory. Each element might be, for example, a starting and ending address, or a starting address and data length. Other encodings may be used as would occur to one skilled in the art. In some embodiments of this variation, the memory is divided into program space and data space, with the address range data element(s) being stored in the program space. When the system also includes a port connectable to an external service tool for reading the error log, the error log may be stored in the data space, and access by the external service tool can be limited to the data space, so that it cannot read the program space, including the address range data element(s).

In still other variations of this form of the invention, the hash value is a cyclic redundancy check. In other embodiments, a second stored value corresponds to the result of applying a second hash function to a second portion of the memory, and the processor executes the programming instructions to apply that second hash value to the second portion of the memory to obtain a second calculated hash value, then to generate an error signal if the second calculated hash value and the second stored hash value are not equal.

Another form of the invention is a method for detecting changes to control data in a vehicles engine control system, comprising (1) storing in a memory a first stored hash value calculated by applying a first hash function to a portion of the control data; (2) after a trigger event, calculating a first calculated hash value by applying the first hash function to the first portion of the control data; and (3) if the first hash value does not equal the first calculated hash value, signaling the mismatch.

In certain embodiments of this form of the invention, the trigger event is powering-on the vehicle.

In one variation of this form, a second stored hash value is also stored in the memory. This second hash value is calculated by applying the first hash function to a second portion of the controlled data. A second calculated hash value is then calculated by applying the first hash function to the second portion of the control data. Then, if the second stored hash value does not equal the second calculated hash value, the mismatch is signaled. In another variation of this form of the invention, the second stored hash value and the second calculated hash value are calculated by applying a second hash function to the second portion of the control data.

In some embodiments of this form, the calculating act comprises executing a first phase by applying the first hash function to a first segment of the first portion of control data, and executing a second phase by applying the first hash function to a second segment of the first portion of controlled data. These phases are separated in time-in some embodiments by a predetermined amount of time, and in other embodiments by the occurrence of a trigger event.

In other variations of this form, the signaling comprises recording an error log in a computer-readable medium. Then a service tool having a display is placed in communication with the computer-readable medium. The error log is read into the service tool, and information from the error log is shown on the display.

DESCRIPTION OF THE ILLUSTRATED EMBODIMENTS

Figure 1:
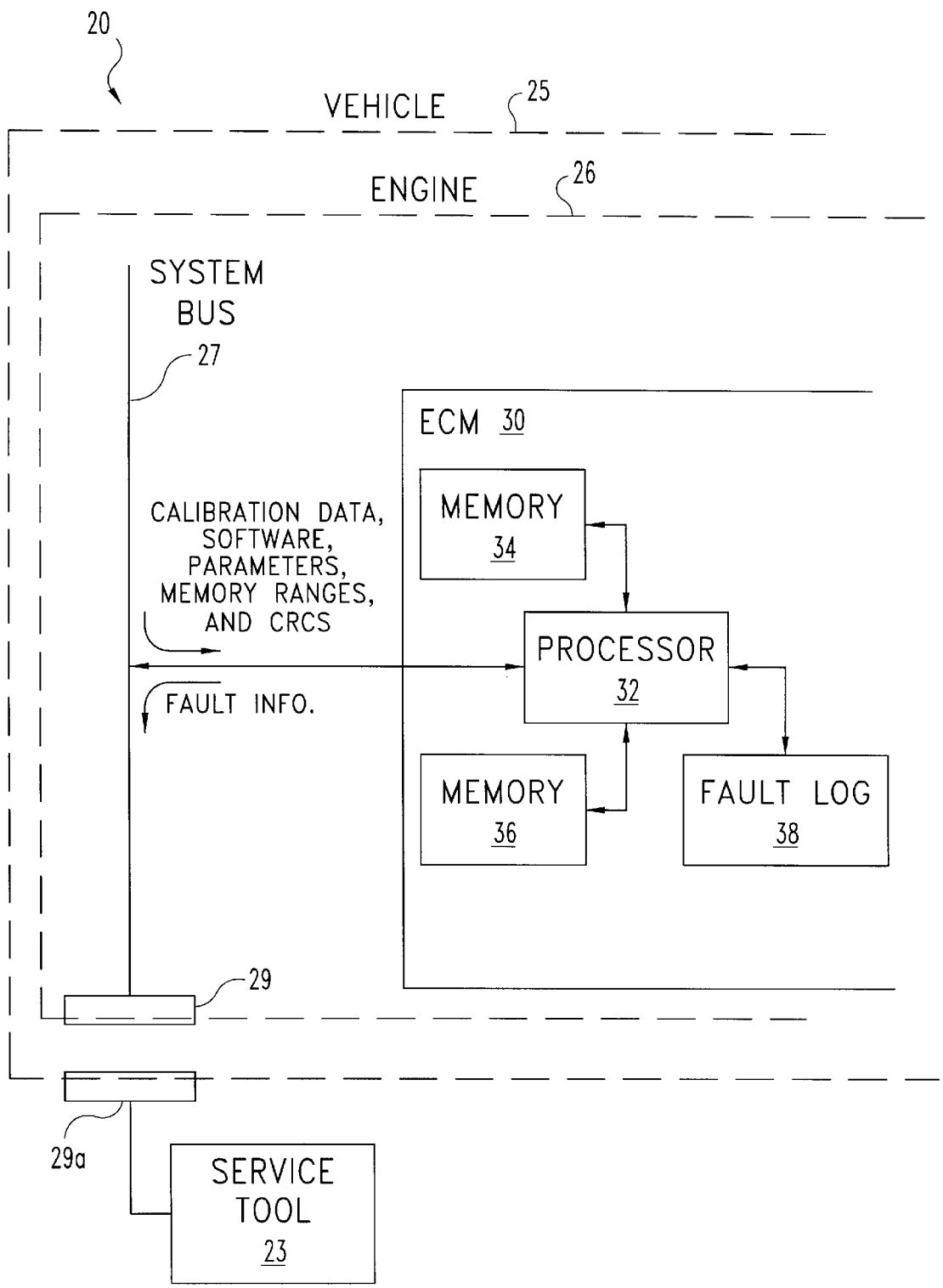
FIG. 1 is a block diagram of an engine control module in a vehicle, showing the flow of data between selected elements thereof.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Figure 2A:
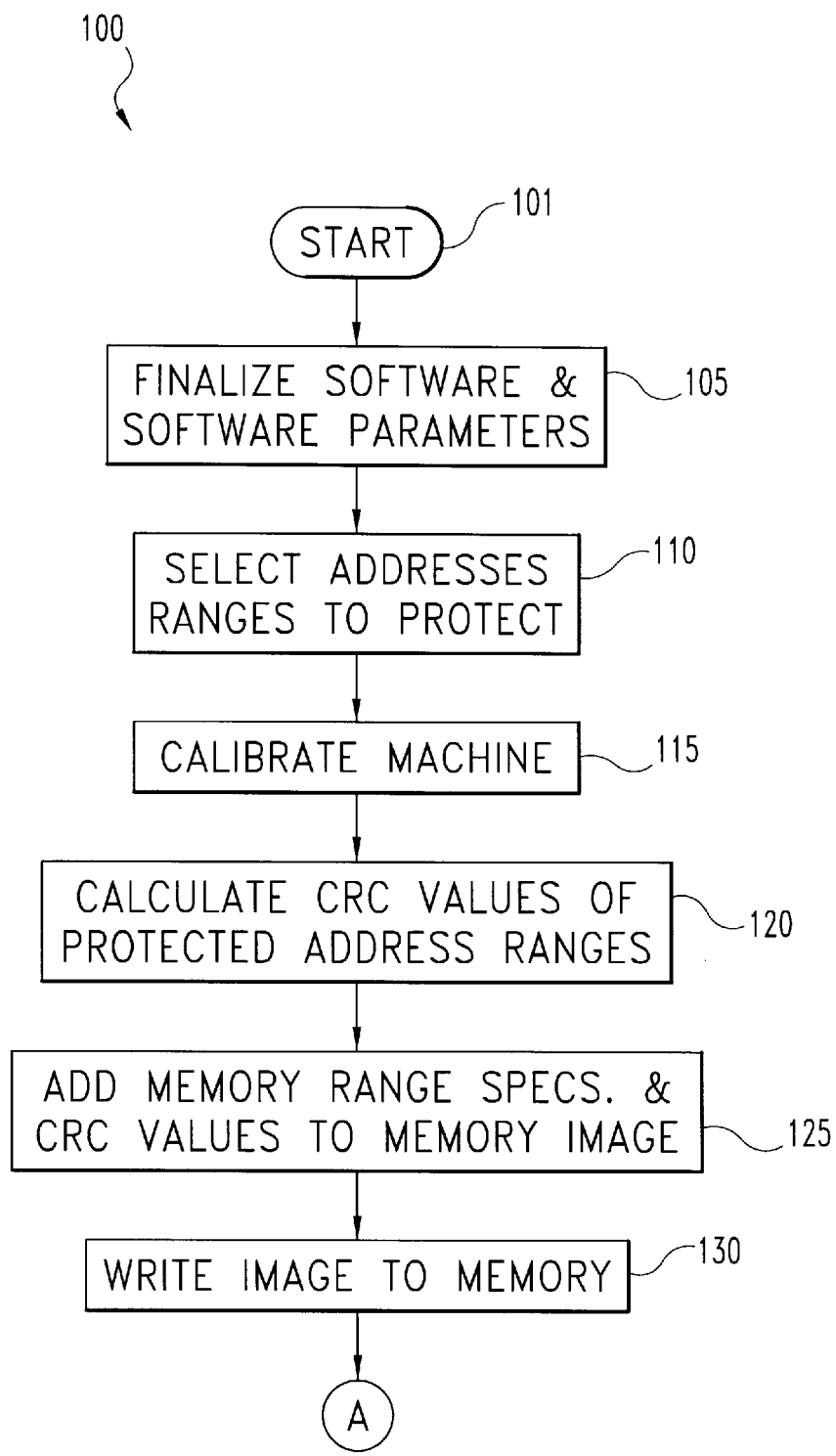
FIGS. 2A–2B are a flow chart showing the recording and checking of hash values to detect tampering in the system shown in FIG. 1.
Figure 2B:
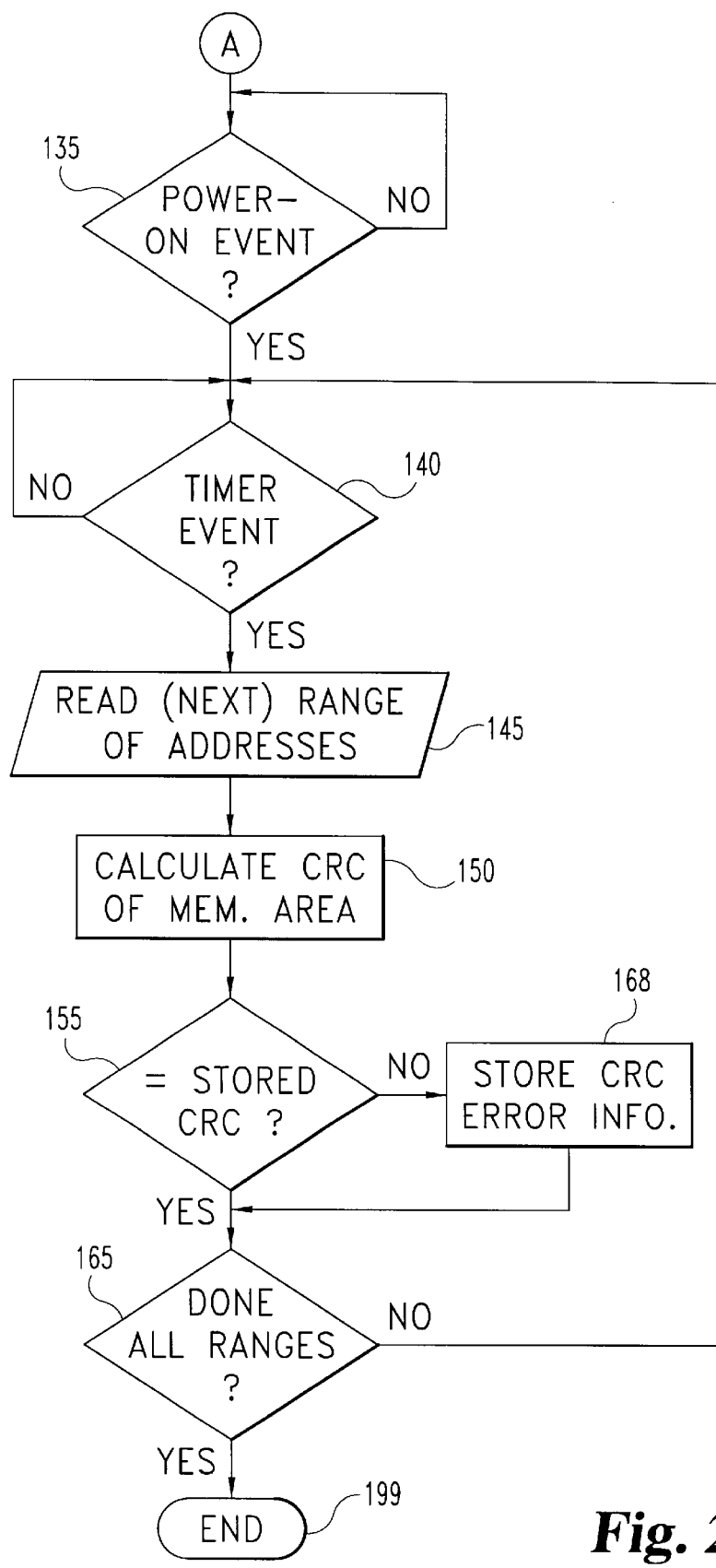

Generally, the tamper detection system illustrated in FIGS. 1–2B stores the result(s) of a hash function as applied to one or more predetermined regions of controller memory, particularly including those regions which store the controller software, software parameters, and calibration data for the associated machine. The hash function is then periodically applied to those regions, and the result is compared with the stored value(s). If they do not match (indicating a change in the data in those regions), the system records the mismatch in a record that can later be retrieved by service personnel or the manufacturer.

It is noted that, as used herein, "hash function" and "hash value" refer to any function (and the result of that function, respectively) that accepts a sequence of data elements and returns, forms, or calculates a shorter sequence of data elements. The hash functions used with the present invention may be, but need not be, cryptographically secure (also known as "one-way") hash functions, such as RIPEMD-160, MD4, MD5, and SHA-1. In addition, a hash function used in conjunction with the present invention need not produce a uniform distribution of results, although this property is often desirable. While the present discussion will use one particular function (the well known "cyclic redundancy check", or "CRC"), any hash function as so defined may be used.

Referring now to FIG. 1, system 20 includes electronic control module (ECM) 30, which controls the operation of engine 26, which provides motive power to vehicle 25. ECM 30 comprises a processor 32, memory 34, and memory 36. Faults or errors encountered in processing are stored by processor 32 in fault log 38 (which may be integrated with, part of, or separate from memories 34, 36) using various techniques and triggers. System bus 27 connects various components of ECM 30 (in this illustration, processor 32, memory 34, memory 36, and fault log 38) to other elements of the electronics and/or control systems of vehicle 25, and preferably to an access port 29 that is connectable via connector 29a to service tool 23. System bus 27 may advantageously be a standard system bus, such as OBD (on-board diagnostics) J1979 bus used in some over-the-road vehicles. Engine 26 is preferably a diesel engine.

The operation of the system will now be described with additional reference to FIGS. 2A–2B and with continuing reference to FIG. 1. Method 100 begins at START point 101. As the control system for vehicle 25 is developed, the control software and associated parameters are generated and finalized (block 105) for installation in a particular vehicle 25. System engineers determine (block 110) the ranges of addresses for which tamper detection is desirable. In some embodiments, this includes all engine control software, control parameters, and calibration information storage locations. In other embodiments, the list of ranges is limited to the modification of which could result in operation of vehicle 25 outside its design specifications. For an internal combustion engine, the selected address ranges might contain fueling tables, timing tables, set points, and the like.

The machine is calibrated (block 115), and the CRC values of the protected address ranges are calculated (block 120). This calculation may be performed by processor 32 using routines stored in a memory 34, 36, or they may even be calculated by a personal computer (not shown) that is not connected to vehicle 25 at all.

The memory range specifications (from block 110) and CRC values of those ranges (from block 120) are added (block 125) to the memory images that are written (block 130) into memory units 34, 36. As indicated by the arrows in FIG. 1, one exemplary embodiment loads calibration data into memory 34 and software, control parameters, a list of the protected memory ranges, and the pre-calculated CRCs into memory 36. In some embodiments, contents of memories 34, 36 are written in a single pass, while in other embodiments, such contents are written (and possibly rewritten) in parts. (Method 100 then continues in FIG. 2B via placeholder A.)

Method 100 waits for a power-on event at decision block 135. Until such event (i.e., while the result of decision block 140 is negative), the control flow of method 100 returns to decision block 135. Upon the occurrence of such an event (positive outcome of decision block 135), method 100 proceeds to decision block 140.

When a timer event occurs (positive result at decision block 140), the system 20 reads (block 145) a range of addresses from memory 36. Processor 32 examines the data in that range and calculates (block 150) the CRC value of that data. If the calculated CRC value does not equal the stored CRC value for that range of addresses (negative result at decision block 155), information regarding the CRC mismatch is stored (block 160). Then, or upon a positive result at decision block 155, it is determined (decision block 165) whether all ranges selected at block 110 have been checked. If not (negative result at decision block 165), control flow waits for another timer event by proceeding to decision block 140. If all ranges have been checked (positive result at decision block 165), method 100 ends at END point 199.

When vehicle 25 (or engine 26) is presented for service or repair at the manufacturer's facility (or a facility authorized by the manufacturer), service tool 23 is operatively coupled to system bus 27 via connector 29a and port 29. Among other actions, service tool 23 reads the contents of fault log 38. If a CRC mismatch is reflected in fault log 38, it may be deduced that the contents of one or more protected regions of memories 34, 36 were modified in a fashion not authorized by the manufacturer of vehicle 25 (or engine 26).

Although the above description discloses a particular structure and method for practicing the invention, many variations are possible. For example, in some embodiments, system 20 does not wait for an initial timer event before calculating the current CRC values for the selected address ranges. (That is, a positive result at decision block 135 leads directly to block 145.)

In other embodiments, the CRC check is triggered by something other than a power-on event. For example, the check could be performed at power-off, periodically during operation of the vehicle (e.g., after each ten hours of running time), periodically based on clock time (daily, or at a particular time on each day in which the vehicle is operated), explicitly by system software, or using any other trigger or interval that would occur to one skilled in the art.

Any information desired or required by the system design can be stored at block 160 in response to a CRC mismatch. For example, one or more of the following may be recorded: time and date at which the mismatch was detected, the running time of the engine as of then, the address range(s) in which the error was detected, and the calculated CRC value of that range.

In various embodiments, the number of address ranges which are checked may be one, two, or more. Furthermore, the sizes of the ranges may be the same or different. Still further, a range may specify all or part of a physical device, and may comprise all or part of multiple physical devices. Yet further, in embodiments wherein two or more ranges are checked, the integrity checking process may be cut short when an error is detected, or (as illustrated above in relation to FIG. 2B and accompanying text) all selected address ranges may be checked every time the process is triggered.

In some embodiments the address ranges are contiguous, while in others the address ranges are not contiguous. In embodiments where a large amount of memory is to be checked, so that the time it would take the processor to create hash values for the entire range would be too great given the urgency of other tasks that the processor must perform and/or manage, the address space may be broken up into multiple, memory ranges for processing in different, time-separated iterations of the loop shown in FIG. 2B between blocks 140 and 165, inclusive.

In still other embodiments, the data from which a single CRC value is calculated may be drawn from two or more non-contiguous regions of a single memory device, and may even be read from one or more regions of each of two or more memory devices. Such regions may be treated by ECM 30 as parts of a single address space or different address spaces.

It is noted that while method 100 is shown in isolation for clarity, it is preferably a part of a control routine or message-handling system by which processor 32 manages the operation of vehicle 25.

It should also be understood that ECM 30 can include more than one processor or CPU and more than one type of memory, where memories 34, 36 are each representative of one or more types. Processor 32 can be comprised of one or more components configured as a single unit. Alternatively, when of a multi-component form, processor 32 can have one or more components located remotely relative to the others. One or more components of processor 32 can be of the electronic variety defining digital circuitry, analog circuitry, or both. In one embodiment, processor 32 is of a conventional, integrated circuit microprocessor arrangement, such as one or more PENTIUM III or PENTIUM 4 processors supplied by INTEL Corporation. In another embodiment, processor 32 is a microcontroller or microprocessor such as a POWERPC supplied by Motorola, Inc.

It should also be understood that memories 34, 36 can each include one or more types of solid-state electronic memory, magnetic memory, or optical memory, just to name a few. By way of non-limiting example, memories 34, 36 can include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), Electrically Erasable Programmable Read Only Memory (EEPROM), or flash memory; an optical disc memory (such as a DVD or CD ROM); a magnetically encoded hard disc, floppy disc, tape, or cartridge media; or a combination of any of these memory types. Also, memories 34, 36 can be of the same type(s) or different, and can be volatile, nonvolatile, or a hybrid combination of volatile and nonvolatile varieties.

It should further be understood that, although certain elements have been selected to aid in the description of the embodiments above, more or fewer elements, acts, steps, units, parameters, devices, and/or connections may be used as would occur to one skilled in the art.

All publications, prior applications, and other documents cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only the preferred embodiments have been shown and described and that all changes and modifications that would occur to one skilled in the relevant art are desired to be protected.

What is claimed is:

1. A system for detecting modification of control data in an electronically controlled engine, comprising:

a memory containing the control data;

data storage containing a first stored value, which corresponds to the result of applying a first hash function to a first portion of said memory;

a processor;

a computer-readable medium, in communication with said processor, encoded with programming instructions executable by said processor to:

apply the first hash function to the first portion of said memory to obtain a first calculated hash value while the engine is operating; and generate an error signal in an error log if the first calculated hash value and the first stored value are not equal.

2. The system of claim 1, wherein:

said data storage also contains a second stored value, which corresponds to the result of applying the first hash function to a second portion of said memory, the second portion being different from the first portion; and the programming instructions are further executable by said processor to:
apply the first hash function to the second portion of said memory to obtain a second calculated hash value while the engine is operating; and
generate an error signal in the error log if the second calculated hash value and the second stored value are not equal.

3. The system of claim 2, wherein the first portion of said memory comprises a plurality of address ranges.

4. The system of claim 3, wherein:

said memory comprises a first memory device and a second memory device;

a first one of said plurality of address ranges is in a first memory device, and a second one of said plurality of address ranges is in a second memory device.

5. The system of claim 4, wherein said first memory device is a flash memory device, and said second memory device is an EEPROM.

6. The system of claim 1, wherein said data storage is in said memory.

7. The system of claim 1, wherein the first portion of said memory is defined by at least one address range data element stored in said memory.

8. The system of claim 7, wherein the first portion of said memory is defined by at least two address range data elements stored in said memory.

9. The system of claim 7, wherein:

said memory comprises program space and data space; and the at least one address range data element is stored in the program space.

10. The system of claim 9, further comprising a port connectable to an external service tool for reading said error log, wherein:

said error log is in said data space; and said external service tool can read from said data space, but not from said program space.

11. The system of claim 1, wherein the first hash function is a cyclic redundancy check.

12. The system of claim 1, wherein:

said data storage also contains a second stored value, which corresponds to the result of applying a second hash function to a second portion of said memory, the second portion being different from the first portion; and the programming instructions are further executable by said processor to:
apply the second hash function to the second portion of said memory to obtain a second calculated hash value while the engine is operating; and
generate an error signal if the second calculated hash value and the second stored value are not equal.

13. The system of claim 1, further comprising an access means for enabling the detachable connection of an external apparatus that, while connected, reads at least a portion of the contents of said memory.

14. A method for detecting changes to control data in a vehicle's engine control system, comprising:

storing in a memory a first stored hash value calculated by applying a first hash function to a first portion of the control data;

calculating a first calculated hash value by applying the first hash function to the first portion of the control data; and if the first hash value does not equal the first calculated hash value, signaling the mismatch.

15. The method of claim 14, further comprising:

storing in the memory a second stored hash value calculated by applying the first hash function to a second portion of the control data;

calculating a second calculated hash value by applying the first hash function to the second portion of the control data; and if the second stored hash value does not equal the second calculated hash value, signaling the mismatch.

16. The method of claim 14, further comprising:

storing in the memory a second stored hash value calculated by applying a second hash function to a second portion of the control data;

calculating a second calculated hash value by applying the second hash function to the second portion of the control data; and if the second stored hash value does not equal the second calculated hash value, signaling the mismatch.

17. The method of claim 14, wherein:

said calculating comprises:
executing a first phase by applying the first hash function to a first segment of the first portion of control data; and
executing a second phase by applying the first hash function to a second segment of the first portion of control data; and said executing acts are separated in time.

18. The method of claim 17, wherein said executing acts are separated by a predetermined amount of time.

19. The method of claim 17, wherein:

said first phase is executed upon occurrence of a first trigger event; and said second phase is executed upon occurrence of a second trigger event.

20. The method of claim 14:

wherein said signaling comprises recording an error log in a computer-readable medium; and further comprising:
placing a service tool in communication with the computer-readable medium, wherein the service tool has a display;
reading the error log into the service tool; and
showing information from the error log on the display.

21. The method of claim 14, wherein the calculating step is performed upon powering-on the vehicle.

* * * * *